United States Patent [19]

Dugan

[11] Patent Number: 5,500,173

[45] Date of Patent: Mar. 19, 1996

[54] METHOD OF MAKING MOLDED MUTICOMPONENT ARTICLES USING A THIN PLATE FLOW DISTRIBUTOR

[75] Inventor: Jeffrey S. Dugan, Asheville, N.C.

[73] Assignee: BASF Corporation, Mount Olive, N.J.

[21] Appl. No.: 390,040

[22] Filed: Feb. 17, 1995

[51] Int. Cl.⁶ .................................................. B29C 47/04
[52] U.S. Cl. .................. 264/75; 29/557; 29/DIG. 16; 29/ DIG. 26; 264/50; 264/540; 264/173.18; 264/245; 264/328.18; 425/130; 425/131.1; 425/190; 425/192 R; 425/462; 428/36.91; 428/67
[58] Field of Search ............................ 264/515, 512, 264/540, 245, 75, 328.18, 171, 173, 171.27, 173.12, 173.18, 246, 50; 425/131.1, 130, 133.1, 133.5, 462, 190, 192 R; 428/36.91, 67; 29/557, DIG. 26, DIG. 16

[56] References Cited

U.S. PATENT DOCUMENTS

| | | | |
|---|---|---|---|
| 2,174,779 | 10/1939 | Delorme | 425/131.1 |
| 2,808,617 | 10/1957 | Terracini et al. | 425/462 |
| 3,097,058 | 7/1963 | Branscum et al. | 264/540 |
| 3,257,482 | 6/1966 | Schechter | 264/515 |
| 3,345,444 | 10/1967 | Pratt | 264/540 |
| 3,422,175 | 1/1969 | Rowland | 425/131.1 |
| 3,577,308 | 5/1971 | Van Drunen et al. | 264/171 |
| 3,773,882 | 11/1973 | Schrenk | 264/171 |
| 3,884,606 | 5/1975 | Schrenk | 425/133.5 |
| 3,924,990 | 12/1975 | Schrenk | 425/131.1 |
| 4,626,187 | 12/1986 | Kamada | 425/133.5 |
| 4,937,134 | 6/1990 | Schrenk et al. | 428/213 |
| 5,162,074 | 11/1992 | Hills | 156/644 |
| 5,202,074 | 4/1993 | Schrenk et al. | 264/245 |
| 5,223,276 | 6/1993 | Djordjevic et al. | 425/131.1 |
| 5,262,894 | 11/1993 | Wheatley et al. | 359/586 |
| 5,316,703 | 5/1994 | Schrenk | 264/171 |

FOREIGN PATENT DOCUMENTS

| | | | |
|---|---|---|---|
| 2437289 | 5/1980 | France | 425/133.5 |
| 54-69172 | 6/1979 | Japan | 264/515 |

*Primary Examiner*—Jeffery R. Thurlow
*Attorney, Agent, or Firm*—Depaoli & Frenkel

[57] ABSTRACT

A method and non-fiber-forming, molded article-forming structure for making a non-fiber, multicomponent molded article containing a plurality of components in a predetermined spatial, non-laminate configuration, wherein the method involves feeding the plurality of respectively dissimilar fluid components, mutually separated, into the molded article-forming structure, which contains a plate flow distributor and a non-fiber-forming shaping section; wherein the flow distributor is made up of at least one distribution plate which is preferably thin and has micromachined on at least one facial surface thereof multiple distribution flow paths having a flow pattern effective to distribute and combine the plurality of components in the predetermined spatial, non-laminate configuration; directing the mutually separated components through the multiple distribution flow paths to distribute and arrange the components to form a fluid structure containing the plurality of components in the predetermined spatial, non-laminate configuration; and subjecting the fluid structure to a non-fiber-forming shaping process in the shaping section to form the molded article therefrom.

40 Claims, 4 Drawing Sheets

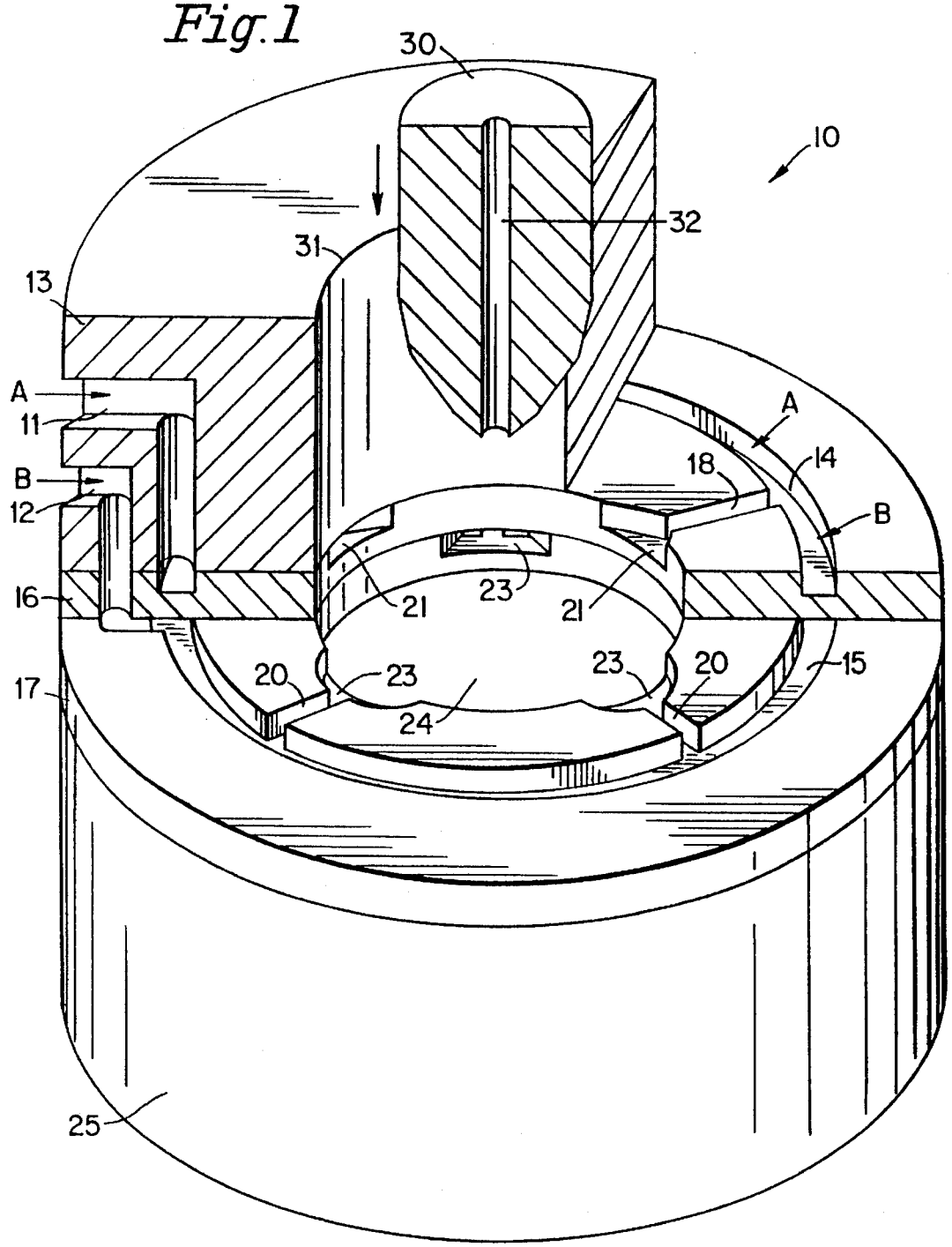

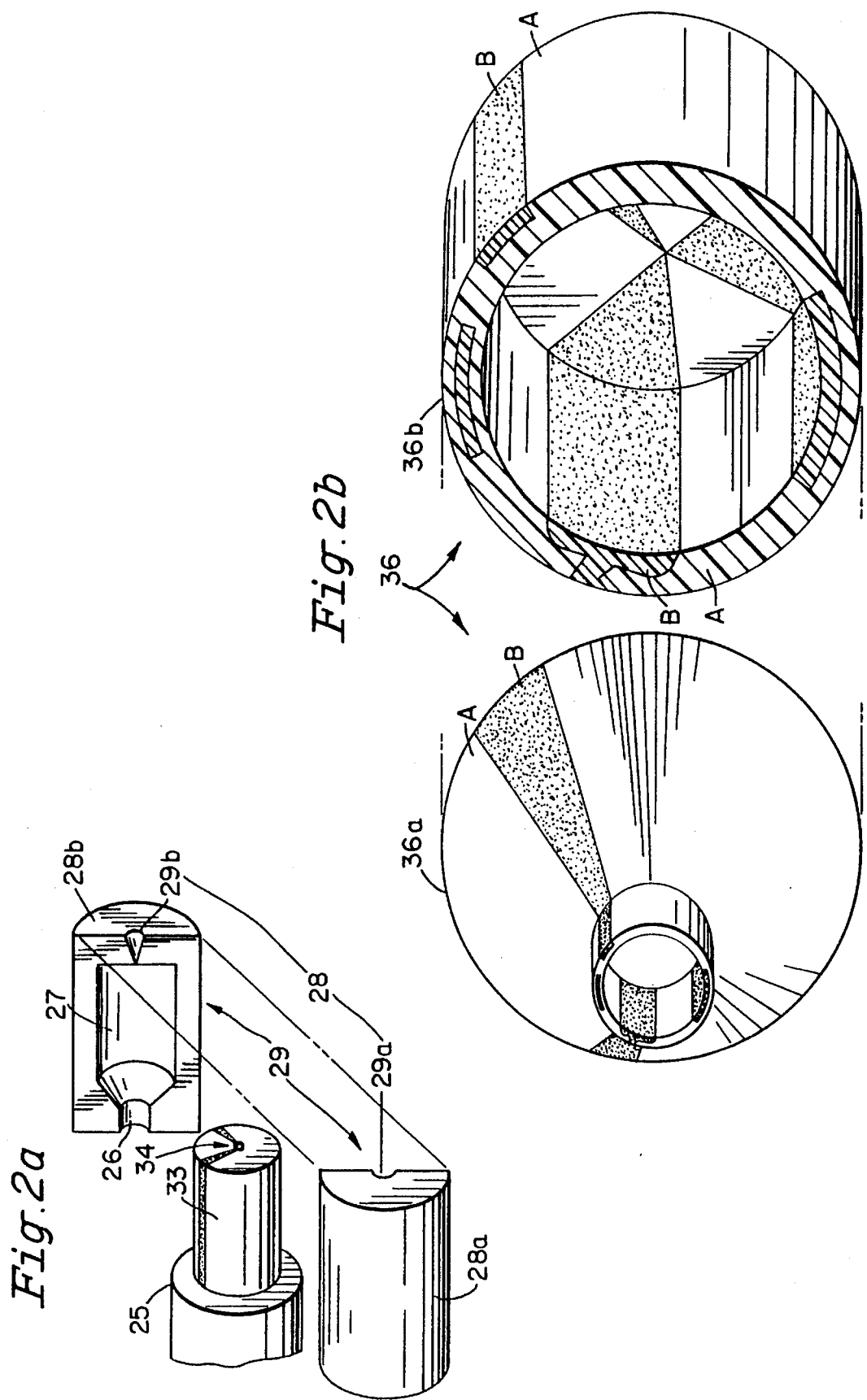

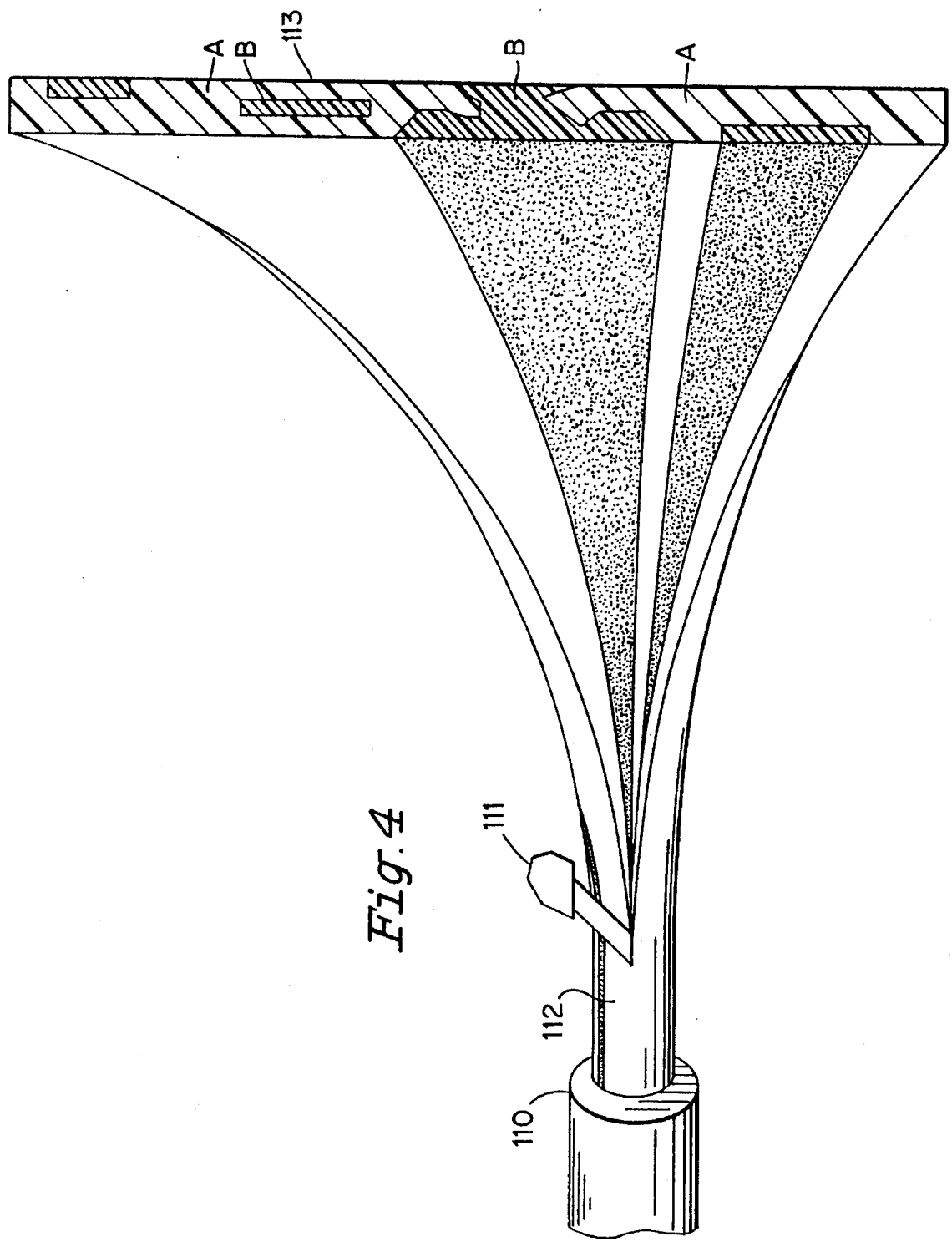

METHOD OF MAKING MOLDED MUTICOMPONENT ARTICLES USING A THIN PLATE FLOW DISTRIBUTOR

BACKGROUND OF THE INVENTION

This invention relates to a method of making molded articles containing a plurality of dissimilar fluid components in a predetermined spatial, non-laminate configuration. More particularly, this invention relates to a method of making such molded articles using a thin plate flow distributor to produce the predetermined spatial, non-laminate configuration.

Molded articles, in particular, those formed from plastic materials, have become a staple of domestic and industrial use. Plastics are particularly lightweight, replacing metal, glass, wood, and ceramics in numerous applications. Importantly, plastics can be water resistant, solvent resistant, weather resistant, etc., or can be composited to increase strength, flexibility, etc.

It is often desirable to impart to a molded product diverse properties or color. To achieve such diverse properties in one product frequently requires the product to be composed of two or more mutually dissimilar components each providing a desired property. Such products are often most efficiently made by coextruding multiple polymer streams into films or profile extrusions, or molding parts with more than one polymer component in the mold.

Conventional methods for accomplishing the delivery of multiple polymer streams to a common mold or extrusion port require complex machined parts which are usually quite bulky and expensive. Because of the design complexity characteristic of these conventional methods, there are often serious constraints on the ways in which polymer streams can be brought together. Furthermore, because distribution channels in flow distributors are generally machined to exhibit a predetermined configuration that is optimized for compatibility with the flow characteristics of the particular polymers flowing therethrough, a particular flow distributor can only be used in a particular method because the flow distributor has been designed for use with the particular polymers used therein.

Plate-containing flow distributors also have drawbacks. Typically, the distribution plates in such flow distributors are relatively expensive, thick metal plates which must be accurately drilled, reamed or otherwise machined at considerable expense. Moreover, with use, polymer material tends to solidify and collect in the distribution flow passages which must be periodically cleaned and then inspected to ensure that the cleaning process has effectively removed all of the collected material. The small size of the flow passages renders the inspection process tedious and time-consuming and, therefore, imparts a considerable cost to the overall cleaning/inspection process. The high initial cost of the distribution plates precludes discarding or disposing of the plates as an alternative to cleaning.

Multilayered articles and methods of making them are disclosed, for example, in U.S. Pat. Nos. 5,223,276; 3,773,882; 3,924,990; and 3,884,606. In U.S. Pat. No. 5,223,276, a multilayer film or sheet of diverse thermoplastic materials is made in a coextrusion apparatus composed of a slit die and a feedblock assembly containing a removable feedblock and a plurality of slotted, layer distribution passages which are mutually spaced apart and lie parallel to the slotted outlet of the die. U.S. Pat. No. 3,773,882 teaches a multilayer film coextrusion method wherein separate streams of two or more diverse thermoplastic materials are passed through a combining means containing a plurality of passages in which the streams are divided, interdigitated and discharged to form a composite layered stream which is parallel to a die orifice through which the stream is subsequently extruded to form a film. U.S. Pat. No. 3,924,990 discloses a coextrusion apparatus for making laminates of two or more diverse thermoplastic materials, wherein the apparatus is made up of a sheeting die and a distribution manifold containing a replaceable distributor block composed of a plurality of passages. In U.S. Pat. No. 3,884,606, a multilayer coextrusion method is disclosed which involves dividing and recombining first and second streams of diverse thermoplastic material in a stream dividing means composed of a plurality of passages to form a composite stream which is then extruded.

Each of the patents discussed above teaches a method and apparatus for making multilayer articles, specifically interdigitated (i.e., containing alternate layers of the diverse materials) multilayer articles. Although multilayer articles are continually desirable, the above patents are limited to forming film laminates and do not suggest molding non-laminate articles composed of two or more diverse materials in a predetermined spatial, non-laminate configuration.

It would be desirable, therefore, to provide a method of making multicomponent molded articles which uses relatively inexpensive, less complex, replaceable and disposable flow distributors, which are relatively easy to machine, clean, and inspect.

U.S. Pat. No. 5,162,074 to Hills teaches a method and apparatus for making multicomponent fibers which uses a relatively inexpensive and less complex flow distributor made up of one or more thin, metal plates etched with distribution flow passages. The use of such a thin plate flow distributor in the spinning method and apparatus disclosed in Hills permits a wide variety of plural-component fiber configurations to be extruded at relatively low cost, with a high density of spinning orifices, and with a high degree of fiber uniformity. Hills teaches that various features must be considered in devising a practical spinning method, including high productivity (i.e., grams of polymer per minute per square centimeter of spinneret surface area), fiber uniformity (i.e., density and shape), and the particular polymers used (i.e., suitability for melt spinning and solution spinning processes). Hills teaches that the only polymers useful therein are those which can undergo melt spinning or solution spinning.

However, Hills does not teach a method or apparatus for making molded articles, including films or parts. In fact, Hills does not even remotely describe molded articles or methods of making molded articles. Hills is only concerned with making fibers. The fluid dynamics involved in fiber-making processes, including spinning and drawing, as in Hills differs from that involved in forming molded articles.

A primary object of this invention is to provide a method for making non-fiber, multicomponent molded articles from a plurality of respectively dissimilar fluid components wherein the method uses a relatively inexpensive disposable flow distributor which is relatively easy to machine, clean, inspect, and re-use.

Another object of this invention is to provide a method for making non-fiber, multicomponent molded articles from a plurality of respective dissimilar fluid components, wherein the method uses a relatively inexpensive, disposable flow distributor which is relatively easy to machine, clean, inspect, and re-use and which is capable of distributing and combining the plurality of components in such a manner as to cause a non-fiber, multicomponent molded article formed therefrom to contain a plurality of components positioned in a predetermined spatial, non-laminate configuration with respect to each other.

A further object of this invention is to provide a structure for making a non-fiber molded article from a plurality of respectively dissimilar components, wherein the structure uses a flow distributor having the characteristics set forth in the preceding objects.

These and other objects which are achieved according to the present invention can be discerned from the following description.

SUMMARY OF THE INVENTION

The present invention provides a method of making a non-fiber, multicomponent molded article from a plurality of respectively dissimilar fluid components, wherein the non-fiber molded article comprises the plurality of components in a predetermined spatial, non-laminate configuration. The method generally comprises the steps of:

(A) providing a non-fiber-forming, molded article-forming structure comprising a flow distributor and a non-fiber-forming shaping section; wherein the flow distributor comprises at least one distribution plate having a first facial surface and an opposite second facial surface, the at least one distribution plate further having on either or both of the first facial surface and the second facial surface multiple distribution flow paths formed therein by a micromachining process, the multiple distribution flow paths having a flow pattern effective to distribute and arrange the plurality of components in the predetermined spatial, non-laminate configuration;

(B) feeding the plurality of respectively dissimilar fluid components, mutually separated, into the non-fiber-forming shaping structure;

(C) directing the mutually separated components through the multiple distribution flow paths in the at least one distribution plate to distribute and arrange the components to form a fluid structure comprising the plurality of components in the predetermined spatial, non-laminate configuration; and (D) subjecting the fluid structure to a non-fiber-forming shaping process in the non-fiberforming shaping section to form the non-fiber molded article.

The present invention is further directed to the structure provided in step (A) of the method of this invention.

Preferably, the method and structure of this invention are used to form non-fiber molded articles such as, e.g., foods; pharmaceuticals; metal articles; concrete articles; thermoplastic articles such as films, sheets, molded parts; and the like. Most preferably, the method and structure of this invention are used to form thermoplastic articles using such shaping processes as blow molding, injection molding, sheet extrusion and the like.

The present invention is not directed to making fibers; the invention is concerned with making non-fiber molded articles.

BRIEF DESCRIPTION OF THE DRAWINGS

FIG. 1 is an isometric sectional view of a thin plate flow distributor useful in the present invention, wherein the flow plate distributor has situated thereon an air injector for use in a blow molding process or a film extrusion process.

FIG. 2a is an isometric exploded view of a shaping section useful in a blow-molding article-forming structure and method within the scope of this invention, wherein the shaping section is made up of an extrusion die and a mold.

FIG. 2b is an exploded view, partially in section of an article molded with the shaping section of FIG. 2a.

FIG. 3a is an exploded isometric view of a molded article-forming structure within the scope of this invention, wherein the structure is used to form a molded article by injection molding, the structure containing a flow distributor and an injection mold.

FIG. 3b is an isometric view of a molded article formed with the article-forming structure of FIG. 3a.

FIG. 4 is a schematic illustration of an embodiment of a shaping section in the molded article-forming structure of this invention, wherein the shaping section is made up of an extrusion die and a slitter and the molded article is a sheet or film.

DETAILED DESCRIPTION OF THE INVENTION

Figures 3A, 3B:
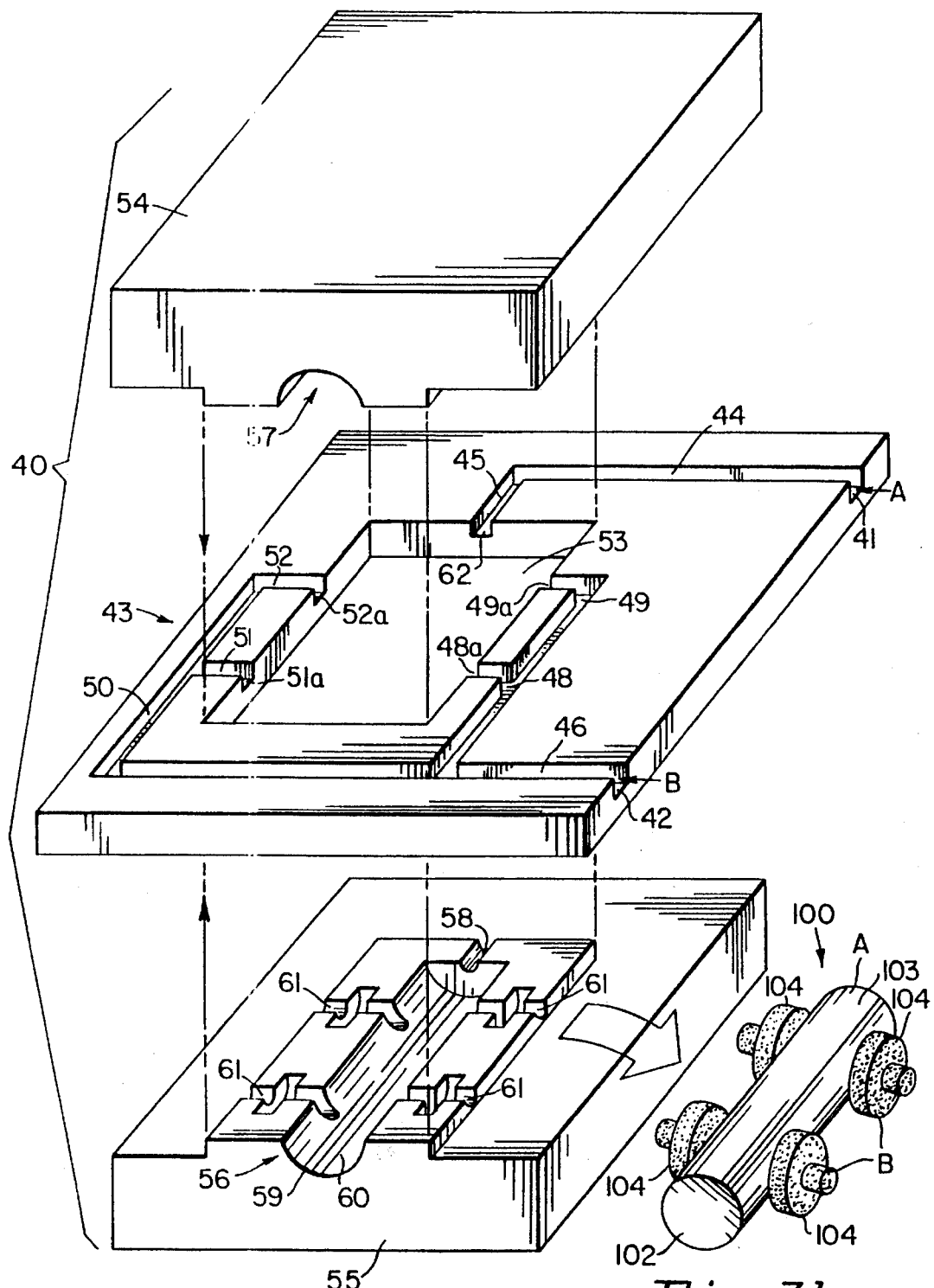

As stated above, U.S. Pat. No. 5,162,074 to Hills is directed only to making fibers. In Hills, the fiber-forming shaping section is intended to take advantage of the flow distributor means to achieve fiber-type spatial configurations. Hills does not remotely describe the articles described in the instant application. The inventors herein are believed to be the first inventors of a method and means for concisely directing two or more components into a desired spatial relationship in a non-fiber molded article.

On the other hand, the method and structure of this invention are used to form a non-fiber, multicomponent molded article from a plurality of dissimilar fluid components wherein the non-fiber, multicomponent molded article contains the components in a predetermined spatial non-laminate configuration.

The term "molded article" as used herein is meant to exclude fibers and to include any other article which can be formed by a shaping process. Examples of molded articles include films or sheets, and molded parts such as formed by blow molding, injection molding, extrusion molding, etc.

The term "non-laminate" as used herein means that the configuration of the plurality of components is not arranged as a plurality of stacked layers wherein each layer is composed of a different material. This term is meant to emphasize that the method and non-fiber-forming, molded article-forming structure of this invention provides a molded article having a single layer or part which contains all of the components in a predetermined spatial configuration. In contrast, the articles described in the extrusion patents cited previously herein are multilayer structures with each layer being composed of a single component.

The number of dissimilar fluid components is not critical to the present invention and will generally depend on the molded article desired. Typically, from about 2 to about 5 components are used, although more can be used in the method and structure of this invention.

The term "dissimilar" as used herein means that each component in the plurality of components is chemically or physically different from the other component(s). The particular dissimilarity between the various components is not critical to the present invention and will depend on the molded article desired. Non-limiting examples of possible differences between the various components include differences in color, viscosity, mechanical properties, chemical compound class, additive content and the like. It is to be understood that the dissimilar components can be the same except for one dissimilar feature, e.g. additive concentration.

The term "fluid" as used herein refers to any liquid (which also includes slurries, e.g., liquids containing additives such as, for example, pigments, catalysts, and the like; food additives; and cement) or gas. Typically, the fluid component is a liquid, e.g., molten polymer or polymer solution. Usually the fluid is a molten polymer and, particularly, a molten thermoplastic polymer or resin. Frequently, the dissimilar fluid components will be molten thermoplastic polymers or resins belonging to different polymer classes.

Suitable thermoplastic polymers or resins which can be used in the present invention are disclosed, for example, in U.S. Pat. Nos. 5,262,894, the disclosure of which is hereby incorporated by reference herein. Examples of suitable thermoplastic polymers or resins include but are not limited to: polyesters; polyamides; copolycarbonates of bisphenol and thiodiphenol; blends of polymethyl methacrylate and vinylidene fluoride; bisphenol A polycarbonate; copolymers of methyl methacrylate and vinylidene fluoride; polymethyl acrylate; polymethyl methacrylate; copolymers of vinylidene fluoride and other halogenated monomers such as chlorofluoroethylene, chlorodifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); copolymers of methyl methacrylate, vinylidene fluoride, and a monomer selected from the group consisting of chlorofluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; and blends of polyvinylidene fluoride and poly(vinyl acetate). Copolymers of the foregoing resins are also useful such as ethylene and vinyl alcohol, styrene and hydroxy ethylacrylate, styrene and maleic anhydride, styrene-butadiene block copolymers, styrene and acrylic acid. Elastomeric resins such as those described in Schrenk et al., U.S. Pat. No. 4,937,134, the disclosure of which is incorporated herein by reference, may also be used to produce an elastomeric or partially elastomeric body. Other useful polymeric materials include polyetheretherketones, polybutene, maleic anhydride grafted polyolefins, and copolymers of ethylene and vinyl acetate.

Thermoplastic polymers which are particularly useful in the method and structure of this invention are polyesters, e.g. polyethylene terephthalate; polyamides, e.g., polycaproamide (nylon); and polyolefins, e.g., polyethylene.

In the method of this invention, the plurality of respectively dissimilar fluid components are fed mutually separated into a flow distributor where the components are distributed and arranged to form a fluid structure containing the plurality of components in a predetermined spatial, non-laminate configuration. The fluid structure is then subjected to a non-fiber-forming shaping process in a non-fiber-forming shaping section to form a non-fiber, multicomponent molded article containing the plurality of components in the predetermined spatial, non-laminate configuration.

The separate components can be provided to the non-fiber-forming, molded article-forming structure from any conventional source used to provide the particular fluid involved. Where the fluid components are molten thermoplastic polymers, the molded article-forming structure may receive the streams of the diverse thermoplastic polymeric materials from a source such as a heat plastifying extruder. The components may be fed, via separate inlets, either into the flow distributor itself or in an optional separate feed section situated upstream of the flow distributor.

The flow distributor used in the method and system of this invention contains at least one distribution plate. Each distribution plate in the flow distributor is preferably perfectly flat and free of scratches. The number of distribution plates will depend on the complexity of the fluid component distribution desired in the final product. Typically, from 1 to about 5 plates are used, although more plates can be used in the method and structure of this invention.

Typically, each distribution plate used in the flow distributor is thin, wherein each plate preferably has a thickness of less than about 0.25 inch and more preferably of from about 0.001 to about 0.10 inch.

Suitable metals for use in the distribution plate(s) include, for example, stainless steel, aluminum, aluminum-based alloys, nickel, iron, copper, copper-based alloys, mild steel, brass, titanium and other micromachinable metals. Because it is relatively inexpensive, stainless steel is typically used.

Each distribution plate has a first facial surface and an opposite second facial surface, wherein on either or both of the first facial and second facial surfaces, multiple distribution flow paths are formed by a micromachining process.

The multiple distribution flow paths have a flow pattern effective to distribute and arrange the plurality of components in a predetermined spatial, non-laminate configuration. The specific flow pattern will depend on the desired molded article.

In a particularly useful embodiment of the flow distributor used in the present invention, the distribution plate(s) is positioned in the flow distributor in a manner such that the first facial surface and the second facial surface of the distribution plate(s) is transverse to a first direction and such that the mutually separated plurality of components are required to flow through the multiple distribution flow paths so that at least one of the plurality of components has at least one instance of flow which is transverse to the first direction.

In a further embodiment of the flow distributor, the distributor plate(s) contains two different arrays of distribution flow paths micromachined into the first facial surface and the second facial surface, respectively, wherein the arrays are joined at specified locations in the distribution plate(s).

Typically, the multiple distribution flow paths in the distribution plate(s) are composed of multiple distribution channels and multiple distribution apertures, wherein the multiple distribution channels have a lesser depth than the thickness of the distribution plate(s), and further wherein the multiple distribution apertures communicate between the first facial surface and the second facial surface of the distribution plate(s). Preferably, at least some of the distribution apertures are in communication with respective distribution channels.

In an embodiment of the multiple distribution flow paths containing distribution channels and distribution apertures, one or more of the distribution apertures are micromachined (preferably etched) to have a ratio between aperture length L and aperture diameter D of preferably less than about 1.5 and more preferably of less than or equal to about 0.7. Typically, the multiple distribution channels are micromachined to a depth of preferably less than or equal to about 0.25 inch and more preferably of less than or equal to about 0.10 inch. The length of the multiple distribution channels is generally unlimited, and, depending on the particular application, typically varies from several millimeters to several centimeters.

In another embodiment of the flow distributor used in this invention, the multiple distribution paths are provided in a plurality of distribution plates, wherein the plurality of distribution plates are positioned sequentially to conduct flow of the mutually separated polymer components through the multiple distribution flow paths in each of the plurality of distribution plates in sequence.

The multiple distribution flow paths are formed in the facial surface(s) of the distribution plate(s) by a micromachining process, such as, for example, etching, stamping, punching, pressing, cutting, molding, milling, lithographing, particle blasting, or combinations thereof. Preferably, the flow paths are etched into the surface(s). Etching, e.g., photochemical etching, provides precisely formed flow paths while being less expensive than many other conventional machining processes, such as, for example, drilling, milling and reaming. Furthermore, etched perforations generally do not have the sharp corners, burrs, and sheet distortions associated with mechanical perforations. Etching processes are well known in the art. Typically, etching is carried out by contacting a surface with a conventional etchant. Micromachining processes, and etching in particular, used to form the flow distribution paths in the distribution plate(s) permits distribution apertures having L/D ratios of less than 1.5 and, if necessary, for some applications, less than 0.7. It is also possible to form distribution channels having depths equal to or less than 0.25 and, if required by certain applications, equal to or less than 0.10 inch. In the method of this invention, the multicomponent stream formed in step (C) is subjected to a non-fiber-forming shaping process in the non-fiber-forming shaping section to form a molded article containing the plurality of components in the predetermined spatial, non-laminate configuration.

The flow distributor can be situated either within or upstream of the shaping section. Typically, the shaping section is a mold (see, e.g., FIGS. 2a and 3); or an extruder including an extrusion die and a slitter to form sheets, wherein the slitter is situated downstream of the extrusion die (see, e.g., FIG. 4). The extruded sheets may then be post formed. Such post forming operations may include, for example, thermoforming, vacuum forming, or pressure forming. Any other shaping process can also be used in conjunction with the flow distributor.

The shaping process of this invention and the shaping section used therein can yield an unlimited number of decorative and structural parts.

The method and article-forming structure of the present invention will now be described in greater detail with reference to FIGS. 1–4. It is to be understood that although the figures below show a flow distribution path for each component, the figures are not intended to limit the invention. In the present invention, the flow distribution paths of the components can be varied in any desired spatial configuration for any desired purpose, including, for example, any decorative or functional purpose.

FIGS. 1 and 2a together illustrate an embodiment of a non-fiber-forming, molded article-manufacturing structure within the scope of this invention, used in conjunction with blow molding. Any other non-fiber-forming, article-shaping processes can be used with the article-manufacturing structure of this invention. Other shaping processes are illustrated in FIGS. 3a, 3b and 4, for example. FIG. 1 shows a cross-sectional view of a flow distributor 10 which is useful in conjunction with a blow-molding shaping apparatus. As shown therein, separate polymer component A and polymer component B are fed, via inlets 11 and 12, respectively, into a feed section 13 of flow distributor 10. Components A and B will be directed through separate, multiple distribution flow paths 14 and 15 in distribution plates 16 and 17, respectively. From the respective flow paths 14 and 15, components A and B are directed to a plurality of respective mixing paths 18 and 20 which terminate at respective spaced outlets 21 and 23, located in distribution plates 17 and 16, respectively. From outlets 21 and 23, components A and B are directed to internal mixing chamber 24 wherein the components A and B are arranged in the desired spatial relationships. It is to be understood that the spacing of outlets 21 and the spacing of outlets 23 and the relative arrangement between outlets 21 and 23 can be widely varied. This variation forms the basis of the invention as multicomponent parts and other structures can be formed with an infinite variety. From internal mixing chamber 24, components A and B are directed into extrusion die 25, which is situated below or downstream of flow distributor 10. The components are extruded in extrusion die 25. The extrudate as parison 33 is passed via conduit 26 into a mold cavity 27 of a bottle-shaped mold 28 formed by bringing together mold sections 28a and 28b along the dotted lines to form mold 28. Mold 28 has an outlet 29 formed by bringing outlet sections 29a and 29b together along the dotted lines.

During the blow molding process, air is injected from air injector 30 situated on a top surface opening 31 of flow distributor 10. Air from injector 30 passes through air flow channel 32, internal mixing chamber 24, conduit 26, mold cavity 27 and outlet 29. The air passing through conduit 26 and mold cavity 27 forms the extrudate into the parison 33 in mold 28, wherein parison 33 contains an internal passageway (not shown) therein formed by the flow of air therethrough. The air leaves parison 33 at exit point 34 and leaves mold 28 via outlet 29, which communicates with exit point 34. The blow molding process described above results in the formation of bottle 36.

FIG. 2b further illustrates a cut-away view of a top section 36a and a bottom section 36b of bottle 36. Top section 36a contains thereon neck section 36c. This cut-away view shows a predetermined spatial non-laminate configuration of component A (light areas) and component B (dark areas).

As stated hereinabove, the present invention is not limited to the spatial relationship of components A and B shown in FIGS. 1, 2a and 2b. The usefulness of this invention is based in part on the fact that components A and B can be arranged in any desired spatial relationship for any purpose, e.g., decorative, functional and the like.

FIG. 3a represents an additional embodiment of a non-fiber-forming, molded article-forming structure and method within the scope of this invention, wherein a non-fiber molded article is formed by injection molding. In this embodiment, structure 40 is composed of inlets 41 and 42 for components A and B, respectively. Structure 40 further contains a single distribution plate 43 (which also serves as a feed plate), with multiple distribution flow channels 44–52 formed therein and an internal cavity region 53. Structure 40 also contains a top mold section 54 and a bottom mold section 55.

Top mold section 54 contains a mold cavity (not shown) which corresponds to the mold cavity 56 in bottom mold section 55. Top mold section 54 further contains an inlet port (not shown), and an outlet port 57. The inlet port of top mold section 54 and the inlet port 58 of bottom mold section 55 combine to form a first end (not shown) of the final molded article 100 shown in FIG. 3b. The outlet port 57 of top mold section 54 and the outlet port 59 of bottom mold section 55 combine to form a second end 102 of the final molded article 100 shown in FIG. 3b. Bottom mold section 55 contains a mold cavity 56 composed of a primary chamber 60 and a plurality of respective side chambers 61.

Plate 43 is sandwiched between top mold section 54 and bottom mold section 55. When attached together along the dotted lines shown in FIG. 3a, mold section 54, plate 43, and mold section 55 form structure 40.

In the injection molding process, components A and B are introduced into plate 43 via inlets 41 and 42, respectively. Component A flows through channels 44 and 45, while component B passes through channels 46–52. Component A flows through outlet 62 and enters via inlet port 58 into the primary chamber 60 of mold cavity 56 in bottom mold section 55 and via an inlet port (not shown) into the primary chamber of the mold cavity (not shown) in top mold section 54. Meanwhile, component B flows through respective outlets 48a, 49a, 51a and 52a into side chambers 61 in mold cavity 56 in bottom mold section 55, and into corresponding side chambers (not shown) in the mold cavity (not shown) in top mold section 54.

Under conventional injection molding conditions, components A and B combine in internal cavity region 53 in plate 43 sandwiched between mold sections 54 and 55 to form a molded article 100, which is shown in FIG. 3b. In FIG. 3b, molded article 100 is composed of a first end (not shown), a second end 102, a main body 103, and respective side sections 104.

FIG. 4 represents an additional embodiment of a non-fiber-forming shaping section used in the non-fiber-forming, molded article-forming structure and method of this invention, wherein a film is formed by extrusion using an extrusion die 110 and a slitter 111. In this embodiment, the multicomponent stream 112 containing components A and B in a predetermined spatial non-laminate configuration exits extrusion die 110 and then passes through slitter 111 to form a film 113 having components A and B in the configurations shown therein.

The method of this invention may further include the steps of discarding the distribution plate(s) after sufficient flow of the fluid components through the flow distributor to require cleaning of the distribution plate(s), and then replacing the discarded distribution plate(s) with an unused substantially identical distribution plate or plates.

As stated hereinabove, the present invention is not limited to the spatial relationships of components A and B illustrated in the figures above. In the present invention, components A and B can be arranged in any desired spatial relationship for any purpose, e.g., any decorative or functional purpose.

What is claimed is:

1. A method of making a non-laminated, non-fiber, multicomponent molded article from a plurality of respectively dissimilar fluid components, wherein said molded article comprises said plurality of components in a predetermined spatial, non-laminate configuration, said method comprising the steps of:

(A) providing a molded-article-forming structure comprising: (i) a plurality of mutually-separated feed conduits, each of said feed conduits being disposed to receive and direct one of said plurality of fluid components; (ii) at least one distribution flow plate disposed downstream of and in fluid communication with said feed conduits; (iii) a combining section disposed in fluid communication with said at least one distribution flow plate; and (iv) a shaping section disposed in fluid communication with said combining section; wherein said at least one distribution flow plate has formed on at least one common facial surface thereof multiple, mutually-separated distribution flow paths having a configuration sufficient to distribute and arrange said fluid components into said predetermined spatial, non-laminate configuration; each flow path having an inlet end disposed in fluid communication with one of said feed conduits and an outlet end disposed in fluid communication with said combining section, wherein each of said flow paths is comprised of at least one distribution channel and one distribution aperture, the at least one distribution channel having a lesser depth than a thickness of said at least one distribution flow plate;

(B) feeding said fluid components through said feed conduits and into said multiple distribution flow paths, each fluid component being fed through a separate feed conduit and into a separate flow path;

(C) directing said fluid components from said flow paths and into said combining section to form a fluid structure having said components arranged in said predetermined spatial, non-laminate configuration; and (D) directing said fluid structure into said shaping section and therein subjecting said fluid structure to a non-fiber-forming, non-laminate-forming shaping process to form said molded article.

2. A method according to claim 1, wherein said molded article is a film, sheet or molded part.

3. A method according to claim 2, wherein said molded article is a film or sheet.

4. A method according to claim 2, wherein said molded article is a molded part.

5. A method according to claim 4, wherein said molded part is a container.

6. A method according to claim 5, wherein said container is a bottle.

7. A method according to claim 1, wherein said fluid components comprise a liquid, a slurry, or a gas.

8. A method according to claim 7, wherein said fluid components comprise a liquid.

9. A method according to claim 8, wherein said liquid comprises a molten polymer or a polymer solution.

10. A method according to claim 9, wherein said liquid comprises a molten polymer.

11. A method according to claim 9, wherein the polymer is a thermoplastic resin.

12. A method according to claim 11, wherein the thermoplastic polymer is a polyester or a polyamide.

13. A method according to claim 1, wherein the at least one distribution plate has a thickness of less than 0.25 inch.

14. A method according to claim 13, wherein said at least one distribution plate has a thickness of from about 0.001 to about 0.10 inch.

15. A method according to claim 1, wherein the structure comprises one distribution plate.

16. A method according to claim 1, wherein the flow distributor comprises a plurality of distribution plates.

17. A method according to claim 1, wherein said at least one distribution plate comprises a metal selected from the group consisting of stainless steel, aluminum, aluminum-based alloys, nickel, iron, copper, copper-based alloys, mild steel, brass, and titanium.

18. A method according to claim 17, wherein said metal comprises stainless steel.

19. A method according to claim 1, wherein a micromachining process is selected from the group consisting of etching, stamping, punching, pressing, cutting, molding, milling, lithographing, particle blasting, and combinations thereof.

20. A method according to claim 19, wherein said micromachining process is etching.

21. A method according to claim 1, wherein said shaping section comprises (a) an extrusion die; (b) a mold; (c) an extrusion die and a mold, wherein said mold is downstream of said extrusion die; or (d) an extrusion die and a slitter, wherein said slitter is situated downstream of said extrusion die.

22. A method according to claim 1, wherein the shaping process is film extrusion, blow molding, or injection molding.

23. A method according to claim 22, wherein said shaping process is injection molding.

24. A method according to claim 22, wherein said shaping process comprises film extrusion.

25. A method according to claim 22, wherein said shaping process comprises blow molding.

26. A method according to claim 1, further comprising the steps of discarding said at least one distribution plate after sufficient flow of fluid components through said distribution plate to require cleaning of said at least one distribution plate; and replacing the discarded at least one distribution plate with an unused substantially identical distribution plate.

27. A non-fiber-forming, non-laminate-forming, molded article-forming structure for making a non-fiber, non-laminated, multicomponent molded article from a plurality of respectively dissimilar fluid components, said molded article comprising said plurality of components in a predetermined spatial, non-laminate configuration, the molded article-forming structure comprising: (i) a plurality of mutually-separated feed conduits, each of said feed conduits being disposed to receive and direct one of said plurality of fluid components; (ii) at least one distribution flow plate disposed downstream of and in fluid communication with said feed conduits; (iii) a combining section disposed in fluid communication with said at least one distribution flow plate; and (iv) a shaping section disposed in fluid communication with said combining section; wherein said at least one distribution flow plate has formed on at least one common facial surface thereof multiple, mutually-separated distribution flow paths having a configuration sufficient to distribute and arrange said fluid components into said predetermined spatial, non-laminate configuration; each flow path having an inlet end disposed in fluid communication with one of said feed conduits and an outlet end disposed in fluid communication with said combining section, wherein each of said flow paths is comprised of at least one distribution channel and one distribution aperture, the at least one distribution channel having a lesser depth than a thickness of said at least one distribution flow plate.

28. A structure according to claim 27, wherein said at least one distribution plate has a thickness of less than about 0.25 inch thick.

29. A structure according to claim 28, wherein said at least one distribution plate has a thickness of from about 0.001 to about 0.10 inch.

30. A structure according to claim 27, wherein said at least one distribution plate comprises a metal selected from the group consisting of stainless steel, aluminum, aluminum-based alloys, nickel, iron, copper, copper-based alloys, mild steel, brass, and titanium.

31. A structure according to claim 30, wherein said metal comprises stainless steel.

32. A structure according to claim 27, wherein said micromachining process is selected from the group consisting of etching, stamping, punching, pressing, cutting, molding, milling, lithographing, particle blasting, and combinations thereof.

33. A structure according to claim 32, wherein said micromachining process is etching.

34. A non-laminated, non-fiber multicomponent molded article formed by the method of claim 1.

35. A molded article according to claim 34, wherein the molded article is a film or sheet.

36. A molded article according to claim 34, wherein the molded article is a molded part.

37. A structure according to claim 27, wherein said combining section is formed in said at least one distribution flow plate.

38. A structure according to claim 37, wherein said combining section is formed in said at least one distribution flow plate by a micromachining process.

39. A structure according to claim 38, wherein said micromachining process comprises etching.

40. A structure according to claim 27, wherein the structure comprises one distribution plate.

* * * * *